(12) United States Patent
Dietrich et al.

(10) Patent No.: US 9,641,989 B1
(45) Date of Patent: May 2, 2017

(54) DISPLAYING MESSAGES ACCORDING TO PRIORITY

(71) Applicant: Amazon Technologies, Inc., Seattle, WA (US)

(72) Inventors: Douglas Sim Dietrich, Los Gatos, CA (US); Shinjan Kumar Tiwary, Sunnyvale, CA (US); Michael Patrick Bauerly, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 43 days.

(21) Appl. No.: 14/495,275

(22) Filed: Sep. 24, 2014

(51) Int. Cl.
| | |
|---|---|
| *H04M 1/725* | (2006.01) |
| *H04W 4/12* | (2009.01) |
| *H04N 21/435* | (2011.01) |
| *H04N 21/4788* | (2011.01) |
| *H04N 21/488* | (2011.01) |
| *H04W 4/00* | (2009.01) |
| *H04M 1/64* | (2006.01) |

(52) U.S. Cl.
CPC ............ *H04W 4/12* (2013.01); *H04N 21/435* (2013.01); *H04N 21/4788* (2013.01); *H04N 21/4882* (2013.01)

(58) Field of Classification Search
CPC ......... H04W 4/00; H04W 4/12; H04M 1/575; H04M 3/5307; H04L 12/587
USPC ........................................................ 455/466
See application file for complete search history.

(56) References Cited

U.S. PATENT DOCUMENTS

| | | | |
|---|---|---|---|
| 7,194,252 B1 | 3/2007 | Jordan | |
| 8,090,241 B2 | 1/2012 | Rajakarunanayake | |
| 8,117,341 B2 | 2/2012 | Matz | |
| 8,312,096 B2 * | 11/2012 | Cohen | ................... H04L 12/587 345/168 |
| 8,611,519 B2 | 12/2013 | Karnalkar et al. | |
| 8,634,848 B1 | 1/2014 | Bozarth et al. | |
| 8,769,682 B2 | 7/2014 | Choyi | |
| 8,823,507 B1 | 9/2014 | Touloumtzis | |
| 2009/0203390 A1 | 8/2009 | Bradbury | |
| 2010/0042470 A1* | 2/2010 | Chang | ................... G06Q 30/02 705/14.64 |
| 2012/0280908 A1 | 11/2012 | Rhoads | |

* cited by examiner

*Primary Examiner* — Huy C Ho
(74) *Attorney, Agent, or Firm* — Eversheds Sutherland (US) LLP

(57) ABSTRACT

Systems and methods are disclosed for selecting from various mechanisms for displaying a message directed to particular user(s) and/or user account(s). The mechanism by which the message may be displayed may be determined based at least in part on prediction of the importance and/or a prediction of a time criticality of the message to the user(s) to whom the message is to be delivered. The message may be received or generated by a hub user device. If the hub user device is not in the process of displaying any content on a primary display screen associated with the hub user device, then the received or generated message may be displayed on the primary display screen. If the hub user device is using the primary display screen to display any variety of content, then the message may be displayed on the primary display screen, redirected to another user device in communicative connection with the hub user device, or stored for later display based at least in part on the prediction of the importance and/or time criticality of the message.

22 Claims, 10 Drawing Sheets

DISPLAYING MESSAGES ACCORDING TO PRIORITY

BACKGROUND

Often times, a message targeted to a particular user and/or user account may be received by a user device. If the user device is in use when the message is received, then displaying the message may be disruptive to the user(s) of the user device. In some cases, the user(s) may not wish to have their activity with the user device interrupted to see the message received by the user device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items; however, various embodiments may utilize elements and/or components other than those illustrated in the figures.

DETAILED DESCRIPTION

Overview

Figure 1:
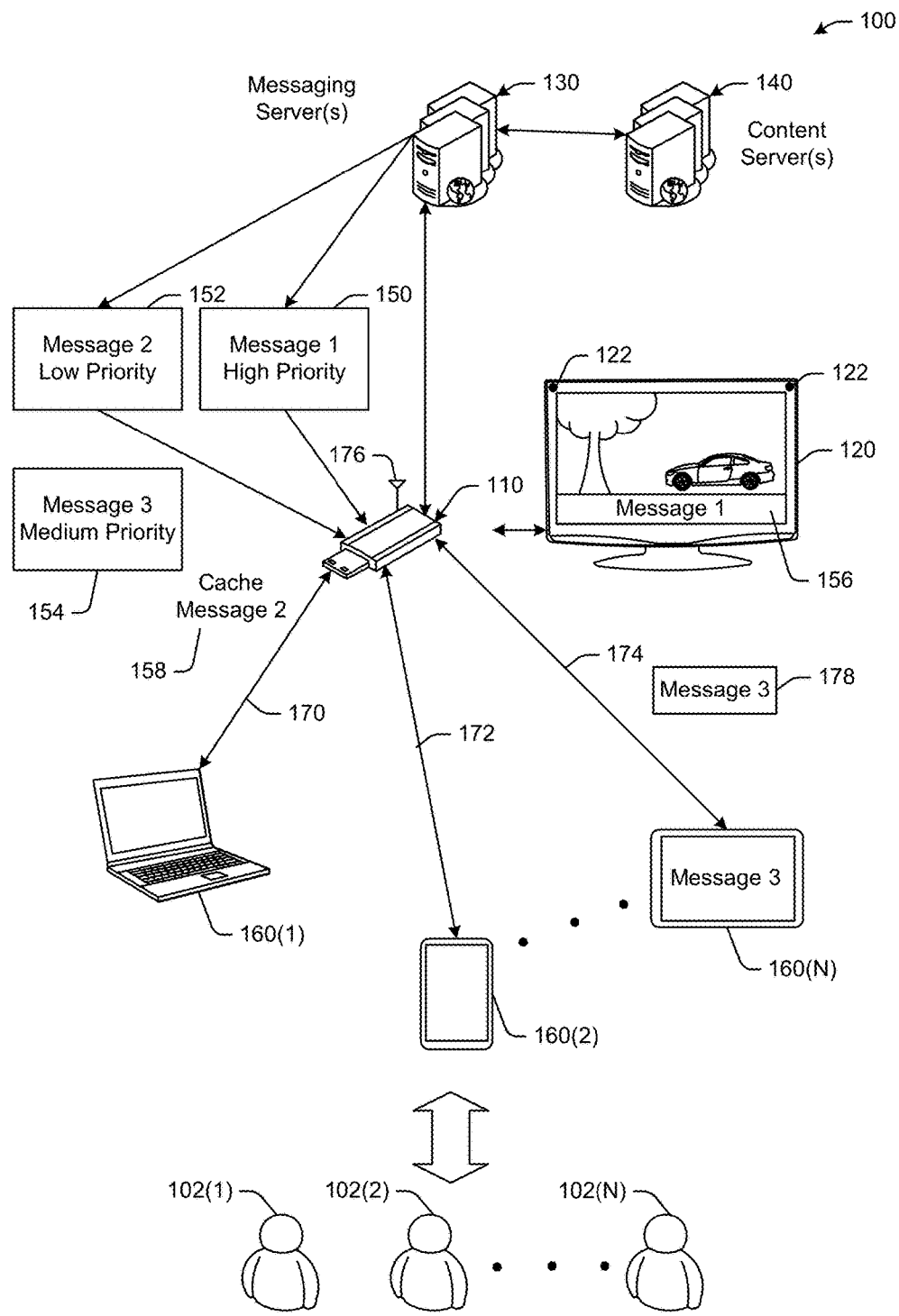
FIG. 1 is a schematic representation of an example environment including messaging server(s) and a plurality of user devices, including a hub user device, associated with one or more users, in accordance with example embodiments of the disclosure.

Example embodiments of the present disclosure are directed to, among other things, selecting one or more mechanisms for displaying a message received by a user and/or user accounts. The message may be received or generated by a hub user device in a household, such as a set-top box (STB) or other suitable hub user device. The message, in example embodiments, may be displayed on a primary display associated with the hub user device, transmitted to one or more other user devices associated with the user and/or user account, or cached for display at a later time. In example embodiments, the mechanism by which the message is displayed may be determined based at least in part on a determination of a priority level of the message. The priority level of the message may be a metric that estimates and/or predicts of the relative importance that the recipient of the message may place on the message. The mechanism by which the message is to be displayed may further be based on the current state and/or activity of the hub user device.

In example embodiments, when a message of any priority level is received and/or generated by the hub user device, and the hub user device is not currently engaged in other activities, such as interacting with a user or rendering content, the message may be displayed by the hub user device, such as on the primary display (e.g., a television screen) associated with the hub user device. However, in example embodiments, the hub user device, when in use, such as for rendering content (e.g., movies, music, podcasts, phone calls, video games) or otherwise interacting with a user on the primary display, may determine if and how to display a message received or generated by the hub user device. In these example embodiments, a message with a relatively high priority level (e.g., a message with a priority level greater than a first threshold value) may be displayed on the primary display coupled to the hub user device, even when the hub device is actively being used in displaying content on the primary display. In example embodiments, displaying this message on the primary display screen may be performed in a relatively non-intrusive manner, such as by a scroll across the primary display screen (e.g., at the top or the bottom of the primary display screen), a relatively small pop-up box on the side of the primary display screen, during a break in the content, and/or while an advertisement associated with the content is being rendered. Further in these example embodiments, a relatively medium priority level (e.g., a message with a priority level less than the first threshold value and greater than a second threshold value) may be transmitted to another user device associated with the user and/or the user account for display to the user on that user device, when the primary display is being used by the hub user device for display of content. In example embodiments, the user device to which the message may be transmitted by the hub user device may be selected based at least in part on the proximity of that user device to the hub user device. Further in these example embodiments, a relatively low priority level (e.g., a message with a priority level less than the second threshold value) may be stored for display at a later time when the hub device may no longer be used for other purposes.

In example embodiments, the messages that may be displayed (e.g., scrolled) on the primary display screen, while content is displayed on the primary display screen, may be those messages that are predicted, such as based at least in part on the associated priority value, to be of particularly high importance and/or of a high level of time criticality for display to the user(s) associated with the message receiving user account. In example embodiments, the messages that may be displayed and transmitted to another user device for display, while content is displayed on the primary display screen, may be those messages that are predicted, such as based at least in part on the associated priority value, to be of a medium level of importance or of a medium level of time criticality for display to the user(s) associated with the message receiving user account. In example embodiments, the messages that may be stored for later display, while content is displayed on the primary display screen, may be those messages that are predicted, such as based at least in part on the associated priority value, to be of a low level of importance and/or of a low level of time criticality for display to the user(s) associated with the message receiving user account. In example embodiments, the types of messages that may be presented on the primary display screen, presented on another user device, or cached for later presentation, may be adjustable by the user.

In example embodiments, the message associated with a user account and/or a user may be received from a messaging server. The message may originate from a variety of sources, such as other server(s) that route and/or generate messages and provide those messages to the messaging server to route to the appropriate hub user device associated with the user account and/or user associated with the message to be transmitted. The messaging server(s) may receive a message of any type, such as, for example, an instant message, a photo-message, a news item, a calendar reminder, a voicemail, an email, a broadcast update or warning, an internet web address, a one-on-one message from another user, combinations thereof, or the like. The priority level associated with a message may be determined, in example embodiments, by the messaging server. In these example embodiments, the messaging server may have and/or maintain a user profile associated with the user account and/or user associated with the message. In other example embodiments, the priority level may be determined by the hub user device. In these example embodiments, the user profile may be used and/or maintained by the hub user device. In yet other example embodiments, the priority value for some messages may be determined by the messaging server and the priority value for other messages may be determined by the hub user device. A non-limiting example of this scenario is that messages transmitted by the messaging server and received by the hub user device may have a corresponding priority value, as determined by the messaging server and appended to the message, such as in the form of metadata. At the same time messages that may be generated at the hub user device may have a corresponding priority value determined by the hub user device. In these example embodiments, the user profile that may be used in determining the priority values may be maintained and/or used at both the hub user device and the messaging servers. In some cases, as the user profile is updated based on learning or new user information, the user profile may be reconciled across the hub user device and the messaging server. In other cases, separate user profiles associated with the user account may be maintained and updated, as needed, at the messaging server and the hub user device.

The user profile may include a variety of information associated with the user account that may be used for routing the message and/or determining the priority value for purposes of determining the mechanism by which to render the message. In example embodiments, the user profile may be stored in a datastore and linked to the particular user account associated with the message and/or additional user accounts, such as additional user accounts that may be associated with the same user(s). This user account may be an email address, a mobile phone number/text message number, a social media account, a short message handle, a Twitter® handle, instant message handle, streaming media account, an application store account, a media provider's account, a retailer's account, combinations thereof, or the like. In these example embodiments, the messaging server(s) may be configured to determine the user profile from the user and/or user account to whom/which a message is to be transmitted. The user account, in example embodiments, may be identified from the received message, such as from header information and/or metadata of the message. In example embodiments, a particular user account may be associated with a single user. In other embodiments, a particular user account may be associated with more than one user (e.g., an email account that may be shared by a family of people). In some cases, identifying a user and, thereby the associated user profile, to whom the message is to be transmitted may be based at least in part on the email address, mobile phone number, or other address information to which the message is to be sent. In other cases, such as when multiple user profiles are associated with the same account/email address/device, additional elements may be considered in identifying the particular user profile to use for ascertaining a priority value of a message or a mechanism to display the message. This analysis may consider elements such as content type of the message (e.g., children's content vs. adult content), past usage history, preferences associated with a user, purchase history of the user, demographical data associated with the user, etc.

The user profile may further provide information associated with relative levels of interest that user(s) associated with the user account to which the message is to be delivered may have with a variety of different messages. These preferences, interest levels, and/or importance levels of the user to whose user account the message is directed may be codified into a set of criteria, rules, and/or rankings as part of the user profile. These criteria, rules, and/or rankings may enable determining priority levels of messages based on factors including, but not limited to, message destination user accounts, source user and/or source user account, key words embedded in the message, metadata associated with the message, other context information associated with the message, combinations thereof, or the like. In example embodiments, a scale may be provided to ascertain the relative weighting of various factors that may be considered in determining the priority value associated with a particular message.

In example embodiments, where there may be more than one user account associated with a particular user profile, the message receiving user account of the message may be a factor in determining the priority level of the received message. For example, a message received from a user's work email address may be of greater importance to the user than a message received at the user's personal email address. As a result, a message to the user's work email address may be assigned a higher priority value than a message to the user's personal email address. In the same or other example embodiments, the sender of the message may be considered when determining a priority value of the message. For example a message from one's family member may be accorded a higher importance than a message from one's friends. In yet the same or other example embodiments, the received message may be parsed to identify key words that may indicate a relatively increased and/or relatively decreased level of importance. For example messages with the words, phrases, or acronyms such as "urgent," "overdue," or "ASAP," may be accorded a greater level of importance than messages that may contain words, phrases, or acronyms such as "at your convenience," or "no rush." The key words, phrases, or acronyms that may trigger a determination and/or change in the priority value of the message may be listed in the user profile associated with the message. As discussed above the determination of the priority value may be performed by the messaging server, the hub user device, or either/both the messaging server or the hub user device.

The user profile associated with a particular user account may be generated and/or updated based on a variety of factors, such as additional information from and/or about the user(s) associated with the user profile. Updating and/or refining the user profile may lead to increasing accuracy and/or precision in predicting a user's perceived importance and/or time criticality associated with a wide variety of messages. In example embodiments, the user profiles may be actively and/or explicitly established and/or subsequently tuned by user(s) associated with the user account. For example, a user may provide information, such as which source(s) of messages, user account(s), and/or key words are related to a relatively higher and/or lower importance or urgency level. In example embodiments, this type of information may be solicited from the user, such as via an online questionnaire that may ask the user to rank different types (e.g., source, user account, content, etc.) of messages according to importance and/or urgency of viewing. Additionally or alternatively, the user may be asked his/her preference in how different types (e.g., source, user account, content, etc.) of messages are to be presented to him/her. Once this type of user information is received and/or solicited, by either or both of the messaging server or the hub user device, the information may be used to learn the preferences of the user(s) associated with a user account and construct a user profile therefrom.

As an alternative to, or as an additional feature, in example embodiments, a user profile may be generated and/or refined based at least in part on information about a user that may be passively collected. In this case, the user may not actively provide information indicative of his/her perceived importance and/or urgency related to various messages. Instead, information may be mined from user actions, behaviors, content viewing history, purchase history, or the like. For example, if it is ascertained that a particular user usually views messages from a particular individual before other messages, then those messages from that individual may be accorded a higher priority value in his/her user profile. As another non-limiting example, if it is ascertained that a particular user views a relatively high number of sports related websites, then it may be determined that messages pertaining to sports (e.g., scores/results, available tickets, etc.) may be accorded a relatively higher priority value relative to other messages for the user. As yet another non-limiting example, if it is ascertained from a user's purchase history that the user is a fan of a particular musical band as a result of the user purchasing content generated by that musical band, then a message that indicates that concert tickets that are likely to sell out for that band are about to go on sale may be deemed both important and urgent for that particular user.

In example embodiments, the criteria used for assessing a priority value of a message, as provided in the user profile, may be dynamic over time, as increased learning is garnered regarding the user(s) associated with the user profile. In some cases, the relative importance and/or urgency of a specific criterion (e.g., source of message, receiving user account, key words, etc.) may be reordered as greater learning of the user's preferences are determined by either or both of the messaging server or the hub user device. Additionally, in some example embodiments, the threshold level(s) to initiate a particular mechanism of presenting the message may be adjustable over time, either explicitly by the user or implicitly ascertained from the user's behavior(s), actions, history, etc.

Once a priority value is determined, either by the messaging server or the hub user device, the hub user device may identify its current state. The current state may be a state where a user is interacting with the hub user device, such as via the primary display screen associated with the hub user device. The interaction state with the hub user devices may include, for example, no interaction (e.g., screen saver mode, standby mode, inactive mode, sleep mode, etc.), rendering content on the primary display screen, playing interactive games on the hub user device, or the like. If there is no interaction with the hub user device, the hub user device may display a received message on the primary display screen, such as on a screen saver display or a blank screen. However, if the hub user device is in any state of interaction with a user, it may be determined based on a predicted and/or estimated level of importance of the message, as provided in its determined priority value, the level of interruption of the user that is warranted in presenting the message to the user. As a result, the priority value may be compared to one or more threshold levels of priority value to determine the mechanism by which to display the message. If the priority value of the message is relatively high (e.g., greater than an upper threshold value), then, in example embodiments, the message may still be displayed on the primary display screen, such as in a non-intrusive manner. For example, the message may be scrolled near the top or bottom of the screen, shown in a pop-up box, shown during interruptions, between interactive game sessions and/or commercial breaks in content displayed on the primary display screen, or the like. If the priority value is neither relatively high nor relatively low (e.g., the priority value is between the upper threshold value and a lower threshold value), then, in example embodiments, the message may be redirected to another user device with which the hub user device is communicatively linked for the purposes of display on that user device. In example embodiments, the message may be redirected by the hub user device to a user device that is deemed to be closest to the hub user device. This proximity of the user devices relative to the hub user device may be determined based at least in part on the RSSI measurements associated with each of the user devices with which the hub user device is connected.

The concepts as discussed above may be better understood with reference to FIG. 1. FIG. 1 is a schematic representation of an example environment 100 including messaging server(s) 130 and a plurality of user devices 160(1), 160(2), . . . , 160(N), including a hub user device 110, associated with one or more users 102(1), 102(2), . . . , 102(N), in accordance with example embodiments of the disclosure. The environment 100, may be any suitable setting where there may be one or more user(s) 102(1), 102(2), . . . , 102(N), hereinafter referred to, individually or in combination, as user 102 and user device(s) 160(1), 160(2), . . . , 160(N), hereinafter referred to, individually or in combination, as user device 160, such as a work setting, a home setting, a restaurant setting, a store setting, a public setting, a private setting, or the like. As depicted, there may be any variety of user devices 160 in environment 100, such as a laptop computer 160(1), a smartphone 160(2), and a tablet computing device 160(N). Additional types of user devices 160 may include smart televisions, game consoles, set-top boxes (STBs), digital video recorders (DVRs), personal computers, desktop computers, notebook computers, personal digital assistants, electronic book (ebook) readers, wearable devices (e.g., smart glasses, wrist/arm bands (e.g., watches, biometric sensors, etc.)), automobiles (e.g., car stereos, in-vehicle infotainment systems, etc.), networked speakers, home security/monitoring equipment, microphone systems, networking equipment (e.g., Wi-Fi router), retail/commercial equipment (e.g., smart billboards, iBeacons), or the like.

Some of the user devices 160 may be shared devices. For example, the laptop computer 160(1) may be shared among more than one user 102, while the smart phone 160(2) may be used by a single one of the users 102. Some types of user devices, such as wearable devices, may be in relatively closer proximity to the user than other types of user devices, such as a smart television. It will be appreciated that while not all environments and/or settings may have the same user devices 160 as depicted here for the environment 100, a variety of environments may have a plurality of user devices 160. Furthermore, some, all, or none of the user devices 160 may be shared by more than one user 102.

The user devices 160 may further include one or more user interfaces, to provide output to the user 102 and/or otherwise provide a mechanism for the user 102 to interact with the user device 160. The user interfaces of the user devices 160 may include, but are not limited to, one or more user input/output interfaces, such as a display, a touch sensitive display, a speaker, a haptic output, or the like. The user device 160 may further include one or more location determination elements, such as motion sensors (e.g., microelectromechanical system (MEMS) accelerometers, gyroscopes, etc.) or global navigation satellite system (GNSS) apparatus for receiving GNSS signals and determining location information therefrom. The user device 160 may be configured, in example embodiments, to provide output to the user 102, such as render a received message, using one or more of the user interfaces, such as the touch sensitive display.

The hub user device 110 may be any suitable device, such as a universal serial bus (USB) dongle, STB, game console, DVR, or indeed, any type of user device as described for the user devices 160. The hub user device 110, in example embodiments, may be communicatively coupled to a primary display screen 120 to display content, messages, or any suitable output of the hub user device 110. Content rendered by the hub user device 110 may include any suitable content, including, but not limited to, video content, audio content, haptic content, olfactory content, media programming, gaming, interactive content, messages, displays, text, web pages, streaming content, podcasts, audio books, music, combinations thereof, or the like. The hub user device 110 may further be configured to interact with the user 102 that may not involve the rendering of any content. For example, the hub user device 110 may be used for the purposes of scanning bar codes, such as for taking inventory and/or placing purchase orders. In another example, the hub user device 110 may be a security system for monitoring and/or managing the security of a physical structure. Indeed, the hub user device 110 may be any user device that is configured to display content, interact with the user 102, and/or provide a service to the user 102. The hub user device 110 may further be configured to communicate, using any suitable wireless standard and/or protocol, with the user devices 160, via an antenna 176, to establish communications links 170, 172, 174. For example, the user devices 160 may be communicatively coupled to the hub user deice 110 via Wi-Fi direct, Wi-Fi, Bluetooth, or the like. The hub user device 110 may be configured to transmit messages to one or more of the user devices 160, such as via wireless connections established therebetween.

The hub user device 110 may further be configured to receive messages, such as from one or more messaging server(s) 130. These messages may be any suitable message, such as messages directed to a user and/or user account with which the hub user device 110 may be associated. The messages may include, for example, an instant message, a photo-message, a news item, a calendar reminder, a voicemail, an email, a broadcast update or warning, an internet web address, a one-on-one message from another user, combinations thereof, or the like. The message may include any suitable type of content, such as text, images, video, audio, haptics, combinations thereof, or the like. The hub user device 110, upon receiving the message may be configured to render the message on the primary display screen 120, one or more speakers 122, and/or other output devices associated with the hub user device 110, cache the message for display at a later time on the primary display screen 120, or transmit the message to one or more of the user devices 160. The hub user device 110 may be configured to select the mechanism by which to present the message based at least on the current activities and/or use of the hub user device 110 and/or the primary display screen 120 and a priority level associated with the received message. In some example embodiments, the hub user device 110 may be configured to determine the priority value of the received message. In other example embodiments, the hub user device 110 may be configured to identify the priority value based on a determination of the same by the messaging server(s) 130. In these example embodiments, the received message may be tagged, such as in metadata, with a determination of its priority value, as determined by the messaging server(s) 130 or any other suitable entity.

The hub user device 110 may still further be configured to generate a message associated with a user 102 and/or a user account. These messages may be of any suitable type, including those described above in the context of messages that may be received by the hub user device 110. In some example embodiments, the hub user device 110 may be configured to generate message(s) pertaining to user interactions with the hub user device 110. For example, the hub user device 110 may be configured to provide suggestions in the form of message(s) to the user 102 based on interactive games that the user 102 may play on the hub user device 110. As another example, the hub user device 110 may be configured to generate a message to the user 102 indicating a programming that the user 102 may like based on the user's profile including the user's preferences and a programming guide. As in the case of receiving a message, the hub user device 110 may be configured to determine a priority value associated with the message that it generates. The hub user device 110 may further be configured to select, based at least in part on the priority value of the message and the current state and/or activities of the hub user device 110, a mechanism for providing the message to the user.

The hub user device 110 may yet further be configured to determine a received signal strength indicator (RSSI) value for each of the wireless connections with the user devices 160. The RSSI may be determined by determining the power of the signal received from each of the user devices 160 by the hub user device 110 via the antenna 176. From this RSSI value of each of the user devices 160, the hub user device 110 may be configured to determine a relative proximity of each of the user devices 160. The hub user device 110, in example embodiments, may be configured to transmit a received or generated message to a user device 160 that is determined to be in relative and/or closest proximity to the hub user device 110 for rendering to the user 102. In some alternative example embodiments, the hub user device 110 may be configured to transmit to the messaging server(s) 130 relative distances and/or RSSI data associated with each of the user devices with which the hub user device 110 has established a communicative link. In some cases, the hub user device 110 may periodically update the messaging server(s) with this location and/or RSSI information associated with the user devices 160. In these example embodiments, the hub user device 110 may receive an indication, along with any messages received from the messaging server(s) 130, of which user device 160 to redirect a message that is deemed too disruptive to present on the primary display screen 120 and too important and/or time critical to cache for later display.

The messaging server(s) 130 may be configured to receive a content, such as a message or elements to embed in a message from any variety of sources, such as the content server(s) 140. The messaging server(s) 130 may further be configured to identify a user account associated with the message and, based at least in part on the user account, identify the hub user device 110 to which the message is to be sent. The messaging server(s) 130, in some example embodiments, may be configured to provide a priority value associated with the message. In the same or other example embodiments, the messaging server(s) 130 may be configured to provide an indication of a user device 160 to which the hub user device 110 is to redirect the message, if the hub user device 110 is displaying content on the primary display screen 120 and/or the one or more speaker(s) 122 associated with the primary display screen 120.

There may be multiple sources, such as content server(s) 140, associated with each user profile (e.g., email service, social media service, streaming movie service, music service, physical product service, cloud storage service, etc.). All of these services may have associated messages (e.g., notification your package is delivered, new email in your inbox, file has been shared with your cloud storage box, etc.). As such, it will be appreciated that a message may be identified to be transmitted to a particular user account and that particular user account identification may be used to identify the user(s) 102 and/or the hub user device 110 associated with the message. In some cases, identifying a user 102 to whom the message is to be transmitted may be based at least in part on the email address, mobile phone number, or other address information to which the message is to be sent. In other cases, such as when multiple profiles are associated with same account/email address/device, additional elements may be considered in identifying the user 102 that is to receive the message.

The message(s) provided by the content server(s) 140 may include any suitable type, including, for example, an instant message, a photo-message, a news item, a calendar reminder, a voicemail, an email, a broadcast update or warning, an internet web address, a one-on-one message from another user, combinations thereof, or the like. The content server(s) 140 may be configured to provide message(s) with any suitable format of content, such as text, images, video, audio, haptics, combinations thereof, or the like. The content server(s) 140 may be configured to provide message(s), or the content associated therewith, to the messaging server(s) 130 via a direct communicative connection with the messaging server(s) 130 or via one or more networks. The one or more network(s) may include any one or a combination of different types of suitable communications networks, such as cable networks, the Internet, wireless networks, cellular networks, and other private and/or public networks.

As shown here, the hub user device may receive "Message 1" 150 and "Message 2" 152 from the messaging server(s) 130. The messaging server(s) 130 may have determined that "Message 1" 150 has a high priority (e.g., relatively high priority value) and that "Message 2" 152 has a low priority (e.g., relatively low priority value). The hub user device 110 may further generate a "Message 3" 154 and perform a priority assessment on the same to determine that "Message 3" 154 has a medium priority (e.g., relatively average priority value). Based at least in part on these relative priorities of the messages 150, 152, 154, the hub user device 110 may display 156 "Message 1" 150 on the primary display screen 120 while content is being rendered thereon, cache 158 "Message 2" 152 to be displayed at a later time, and transmit 178 "Message 3" 154 to the user device 160(N), deemed to be in closest proximity to the hub user device 110, for display thereon.

This brief introduction, including section titles and corresponding summaries, is provided for the reader's convenience and is not intended to limit the scope of the claims nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

Figure 2:
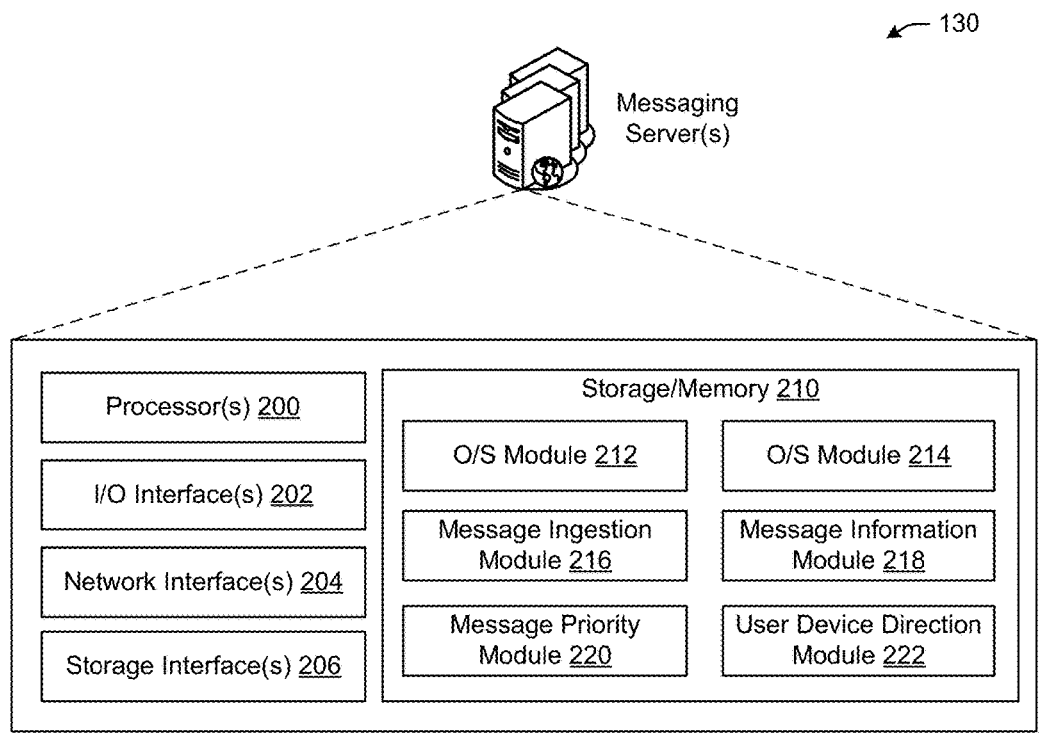
FIG. 2 is a block diagram of example messaging server(s) for directing messages to the hub user device of FIG. 1, in accordance with example embodiments of the disclosure.

FIG. 2 is a block diagram of example messaging server(s) for directing messages to the hub user device of FIG. 1, in accordance with example embodiments of the disclosure. The messaging server(s) 130 may include one or more processors 200, one or more I/O device interfaces 202, one or more network interface(s) 204, one or more storage interface(s) 206, and one or more storage/memories 210.

In some example embodiments, the processors 200 of the messaging server(s) 130 may be implemented as appropriate in hardware, software, firmware, or combinations thereof. Software or firmware implementations of the processors 200 may include computer-executable or machine-executable instructions written in any suitable programming language to perform the various functions described. Hardware implementations of the processors 200 may be configured to execute computer-executable or machine-executable instructions to perform the various functions described. The one or more processors 200 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The messaging server(s) 130 may also include a chipset (not shown) for controlling communication between the one or more processors 200 and one or more of the other components of the messaging server(s) 130. The one or more processors 200 may also include one or more application specific integrated circuits (ASICs) or application specific standard products (ASSPs) for handling specific data processing functions or tasks.

The input/output (I/O) device(s) such as the touch sensitive display screen(s), speaker(s), haptic device(s), or the like, may be controlled via the one or more I/O device interfaces 202. The network interfaces(s) 204 may allow the messaging server(s) 130 to communicate via the networks and/or via other communicative channels. The messaging server(s) 130 may, therefore, be configured to access one or more remote servers, cloud servers, and/or cloud storage resources. The storage interface(s) 206 may enable the messaging server(s) 130 to read and/or write to any variety of datastores, including, for example, the storage/memory 210.

The storage/memory 210 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read-only memory (EEPROM), non-volatile RAM (NVRAM), universal serial bus (USB) removable memory, or combinations thereof.

The storage/memory 210 may store program instructions that are loadable and executable on the processor(s) 200, as well as data generated or received during the execution of these programs. Turning to the contents of the storage/memory 210 in more detail, the storage/memory 210 may include one or more operating systems (O/S) 212, an applications module 214, a message ingestion module 216, a message information module 218, a message priority module 220, and a user device direction module 222. Each of the modules and/or software may provide functionality for the messaging server(s) 130, when executed by the processors 200. The modules and/or the software may or may not correspond to physical locations and/or addresses in storage/memory 210. In other words, the contents of each of the modules 212, 214, 216, 218, 220, 222 may not be segregated from each other and may, in fact be stored in at least partially interleaved positions on the storage/memory 210.

The O/S module 212 may have one or more operating systems stored thereon. The processors 200 may be configured to access and execute one or more operating systems stored in the (O/S) module 212 to operate the system functions of the messaging server(s) 130. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 214 may contain instructions and/or applications thereon that may be executed by the processors 200 to provide one or more services. These instructions and/or applications may, in certain aspects, interact with the (O/S) module 212 and/or other modules of the messaging server(s) 130. The applications module 214 may have instructions, software, and/or code stored thereon that may be launched and/or executed by the processors 200 to execute one or more applications and functionality associated therewith. These applications may include, but are not limited to, functionality such as web browsing, business, communication, graphics, word processing, publishing, spreadsheets, databases, gaming, education, entertainment, media, project planning, engineering, drawing, or combinations thereof.

The message ingestion module 216 may have instructions stored thereon that when executed by the processors 200, configure the messaging server(s) 130 to perform a variety of functions associated with receiving and/or generating messages to be transmitted to one or more hub user devices 110 associated with a particular user 102 (e.g., a user account associated with the particular user 102). The processor(s) 200 may be configured to generate and/or receive, such as from the content server(s) 140, a message to be provided to a particular user 102. In some cases, content, such as a news item, media content, or calendar item, may be received from the content server(s) 140 or other entities, and the processor(s) 200 may be configured to generate a message incorporating the content received. In example embodiments, the processor(s) may be configured to ascertain an identity of an intended recipient user 102 for messages or content received from the content server(s) 140 or other sources of messages and/or content. In some cases, identifying a user 102 and/or user account to which the message is to be transmitted may be based at least in part on the email address, mobile phone number, or other address information to which the message is to be sent.

The message information module 218 may have instructions stored thereon that when executed by the processors 200 may enable the messaging server(s) 130 to extract information elements from a header, metadata, and or the body of the message. These information elements may be used for the purposes of comparing to a variety of criteria provided in the user profile associated with the message to determine a prediction of the importance and/or the urgency of the message to be transmitted to a destination hub user device 110. The information elements may include, for example, a source (e.g., sender or sender user account) of the message, key words in the header or the body of the message, any priority associated with the message, the user account to which the message was sent, other contextual information of the message, or the like. Indeed any information that can be harvested from the message for the purposes of comparing to criteria and/or characteristics of messages in a user profile to assign a priority value to the message may be extracted from the message. Additionally, in example embodiments, context information associated with the message and/or the operating environment of the messaging server(s) 130 and/or the hub user device 110 may be considered in extracting/generating the information elements for consideration in determining a priority value associated with the message. The context information may be any variety of informational items, including time, location, weather, events, schedules, holidays, or the like.

The message priority module 220 may have instructions stored thereon that when executed by the processors 200 may enable the messaging server(s) 130 to determine a priority value associated with a message. In this case, information elements associated with the message and determined by the processes enabled by the message information module 218 may be applied to the user profile corresponding to the message to determine a priority value of the message. In example embodiments, the processors 200 may be configured to compare the information elements of the message and/or context information to characteristics of messages for which a priority score is provided in the user profile. If a match is found between one or more of the information elements and the characteristics mapped to priority values, then the corresponding priority value may be assigned to the message. If more than one information element is found to match with characteristics mapped in the user profile, then, in some cases the highest priority value may be assigned to the message. In other cases, an average of the values may be used as the priority value of the message.

In example embodiments, the criteria used for assessing a priority value of a message, as provided in the user profile, may be dynamic over time, as increased learning is garnered regarding the user(s) 102 associated with the user profile. In some cases, the relative importance and/or urgency of a specific criterion (e.g., source of message, receiving user account, key words, context, etc.) may be reordered as greater learning of the user's preferences are determined by the processor(s) 200, in some cases, in cooperation with the hub user device 110. Additionally, in some example embodiments, the threshold level(s) to initiate a particular mechanism of presenting the message may be adjustable over time, either explicitly by the user or implicitly ascertained form the user's behavior(s), actions, history, context, etc.

The user device direction module 222 may have instructions stored thereon that when executed by the processors 200 may enable the messaging server(s) 130 to a user device 160 to which the hub user device 110 is to redirect a message if the hub user device 110 is not in inactive mode. In some example embodiments, the messaging server(s) 130 and the processors thereon may receive an indication of the relative proximity of user devices 160 that may be communicatively coupled to the hub user device 110 that is the destination of a message. In some cases, this indication may be RSSI values corresponding to each of the user devices 160 as measured by the hub user device 110 and provided by the hub user device 110 to the messaging server(s) 130. In example embodiments, this information may be received periodically from the hub user devices 110. In other example embodiments, this information may be solicited from the hub user device 110 by the messaging server(s) 130. In other example embodiments, the messaging server(s) 130 may receive one or more locational information related to the user devices 160, such as GPS coordinates, inertial sensor (e.g., accelerometer sensor) data, and/or Wi-Fi AP triangulation data, either directly from the user devices 160 or via the hub user device 110. From the information about the relative location of each of the user devices 160 to the hub user device 110, a particular user device 160, such as the user device 160 closest to the hub user device 110 may be selected for redirecting the message if the hub user device 110 is otherwise engaged and the message is important enough to present to the user 102 without caching until a later time. In some example embodiments, the processor(s) 200 may be configured to direct a message directly to the user device 160 that is to receive the message. In these example embodiments, the messaging server(s) 130 may receive a notification and/or solicit a status of the hub user device 110 to ascertain if the hub user device 110 is engaged in any activities that would preclude it from surfacing the message, such as on the primary display screen 120. If it is determined that the hub user device 110 is otherwise engaged and the priority value is determined to be such that the message is to be redirected to another user device 160 associated with the recipient user 102, then messaging server(s) 130 and the processor(s) 200 thereon may be configured to bypass the hub user device 110 entirely and transmit the message directly to the user device 160 determined to be the recipient user device 160.

It will be appreciated that there may be overlap in the functionality of the instructions stored in the operating systems (O/S) module 212, the applications module 214, the message ingestion module 216, the message information module 218, the message priority module 220, and the user device direction module 222. In fact, the functions of the aforementioned modules 212, 214, 216, 218, 220, 222 may interact and cooperate seamlessly under the framework of the messaging server(s) 130. Indeed, each of the functions described for any of the modules 212, 214, 216, 218, 220, 222 may be stored in any module 212, 214, 216, 218, 220, 222 in accordance with certain example embodiments of the disclosure. Further, in certain example embodiments, there may be one single module that includes the instructions, programs, and/or applications described within the operating systems (O/S) module 212, the applications module 214, the message ingestion module 216, the message information module 218, the message priority module 220, and the user device direction module 222.

Figure 3:
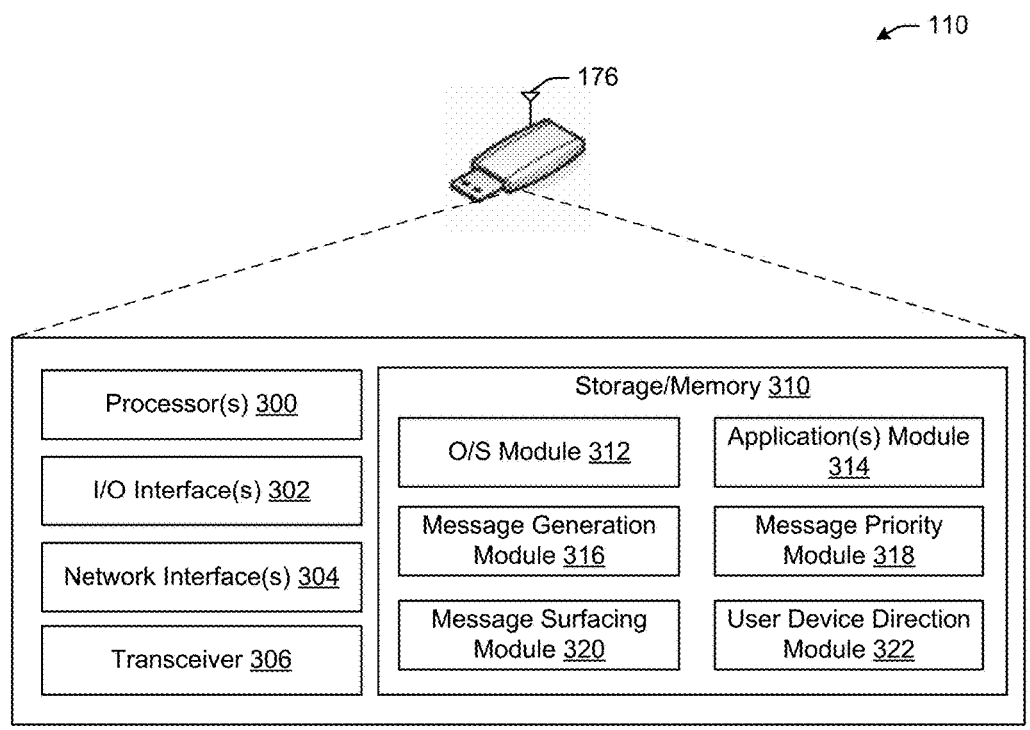
FIG. 3 is a block diagram of an example hub user device for receiving a message and determining the mechanism by which to display the message, in accordance with example embodiments of the disclosure.

FIG. 3 is a block diagram of an example hub user device 110 for receiving a message and determining the mechanism by which to display the message, in accordance with example embodiments of the disclosure. The hub user device 110 may include one or more processor(s) 300, one or more I/O device interface(s) 302, one or more network interface(s) 304, one or more transceiver(s) 306, and one or more storage/memories 310. The description of the processor(s) 300, the I/O device interface(s) 302, the network interface(s) 304, and the one or more storage/memories 310 may be substantially similar to processor(s) 200, the I/O interface(s) 202, the network interface(s) 204, and the one or more storage/memories 210, respectively, of the messaging server(s) 130, as described in reference to FIG. 2 and, in the interest of brevity, will not be repeated here. The one or more transceiver(s) 306 may enable the processor(s) 300 to wirelessly communicate with the one or more user devices 160 via the antenna 176.

The storage/memory 310 may store program instructions that are loadable and executable on the processor(s) 300, as well as data generated or received during the execution of these programs. Turning to the contents of the storage/memory 310 in more detail, the storage/memory 310 may include one or more operating systems (O/S) 312, an applications module 314, a message generation module 316, a message priority module 318, a message surfacing module 320, and a user device direction module 322. Each of the modules and/or software may provide functionality for the hub user device 110, when executed by the processors 300. The modules and/or the software may or may not correspond to physical locations and/or addresses in the storage/memory 310. In other words, the contents of each of the modules 312, 314, 316, 318, 320, 322 may not be segregated from each other and may, in fact be stored in at least partially interleaved positions on the storage/memory 310.

The O/S module 312 may have one or more operating systems stored thereon. The processors 300 may be configured to access and execute one or more operating systems stored in the (O/S) module 312 to operate the system functions of the hub user device 110. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 314 may contain instructions and/or applications thereon that may be executed by the processors 300 to provide one or more services. These instructions and/or applications may, in certain aspects, interact with the (O/S) module 312 and/or other modules of the hub user device 110. The applications module 314 may have instructions, software, and/or code stored thereon that may be launched and/or executed by the processors 300 to execute one or more applications and functionality associated therewith. These applications may include, but are not limited to, functionality such as web browsing, business, communication, graphics, word processing, publishing, spreadsheets, databases, gaming, education, entertainment, media, project planning, engineering, drawing, or combinations thereof.

The message generation module 316 may have instructions stored thereon that when executed by the processor(s) 300, configure the hub user device 110 to generate message to be displayed to the users 102. These messages may be of any suitable type. In some example embodiments, the hub user device 110 may be configured to generate message(s) pertaining to user interactions with the hub user device 110. For example, the hub user device 110 may be configured to generate a message to the user 102 indicating a programming that the user 102 may like based on the user's profile including the user's preferences and a programming guide. As in the case of receiving a message, the hub user device 110 may be configured to determine a priority value associated with the message that it generates.

The message priority module 318 may have instructions stored thereon that when executed by the processors 300 may enable the hub user device 110 to determine a priority value associated with a message that is either generated by the hub user device 110 or received by the hub user device 110, such as from the messaging server(s) 130. In this case, the processors 300 may be configured to extract information elements associated with the message. These information elements may be used for the purposes of comparing to a variety of criteria provided in the user profile associated with the message to determine a prediction of the importance and/or the urgency of the message. The information elements may include, for example, a source (e.g., sender or sender user account) of the message, key words in the header or the body of the message, any priority associated with the message, the user account to which the message was sent, other contextual information of the message, or the like. Additionally, in example embodiments, context information associated with the message and/or the operating environment of the hub user device 110 may be considered in extracting/generating the information elements for consideration in determining a priority value associated with the message. Indeed any information that can be harvested from the message for the purposes of comparing to criteria and/or characteristics of messages in a user profile to assign a priority value to the message may be extracted from the message.

The processors 300 may then be configured to apply the extracted information elements to the user profile corresponding to the message to determine a priority value of the message. In example embodiments, the processors 300 may be configured to compare the information elements of the message to characteristics of messages for which a priority score is provided in the user profile. If a match is found between one or more of the information elements and the characteristics mapped to priority values, then the corresponding priority value may be assigned to the message. If more than one information element is found to match with characteristics mapped in the user profile, then, in some cases the highest priority value may be assigned to the message. In other cases, an average of the values may be used as the priority value of the message.

In example embodiments, the criteria used for assessing a priority value of a message, as provided in the user profile, may be dynamic over time, as increased learning is garnered regarding the user(s) 102 associated with the user profile. In some cases, the relative importance and/or urgency of a specific criterion (e.g., source of message, receiving user account, key words, context, etc.) may be reordered as greater learning of the user's preferences are determined by the processor(s) 300, in some cases, in cooperation with the messaging server(s) 130. Additionally, in some example embodiments, the threshold level(s) to initiate a particular mechanism of presenting the message may be adjustable over time, either explicitly by the user or implicitly ascertained form the user's behavior(s), actions, history, context, etc.

The message surfacing module 320 may have instructions stored thereon that when executed by the processors 300 may enable the hub user device 110 to present the message to the user(s) 102 via a variety of mechanisms. The processors 300 may be configured to render a message with a relatively high priority level (e.g., a message with a priority level greater than a first threshold value) on the primary display screen 120 coupled to the hub user device 110, even when the hub user device 110 is actively being used in displaying content on the primary display screen 120. In example embodiments, displaying this message on the primary display screen 120 may be performed in a relatively non-intrusive manner, such as by a scroll across the primary display screen (e.g., at the top or the bottom of the primary display screen), a relatively small pop-up box on the side of the primary display screen, during a break in the content, and/or while an advertisement associated with the content is being rendered. Further in these example embodiments, a relatively medium priority level (e.g., a message with a priority level less than the first threshold value and greater than a second threshold value) may be transmitted to another user device associated with the user and/or the user account for display to the user on that user device, when the primary display is being used by the hub user device for display of content. In example embodiments, the user device to which the message may be transmitted by the hub user device 110 may be selected based at least in part on the proximity of that user device to the hub user device. Further in these example embodiments, a relatively low priority level (e.g., a message with a priority level less than the second threshold value) may be stored for display at a later time when the hub device may no longer be used for other purposes.

The user device direction module 322 may have instructions stored thereon that when executed by the processors 300 may enable the hub user device 110 to determine a user device 160 to which to redirect a message if the hub user device 110 is not in an inactive mode. In example embodiments, the hub user device 110 and the processors 300 thereon may determine a RSSI value corresponding to each of the user devices 160 with which the hub user device 110 is communicatively coupled. The processors 300 may estimate a relative location of each of the user devices 160 based at least in part on the corresponding RSSI values. From the information about the relative location of each of the user devices 160 to the hub user device 110, a particular user device 160, such as the user device 160 closest to the hub user device 110, may be selected for redirecting the message if the hub user device 110 is otherwise engaged and the message is important enough to present to the user 102 without caching until a later time.

It will be appreciated that there may be overlap in the functionality of the instructions stored in the operating systems (O/S) module 312, the applications module 314, the message generation module 316, the message priority module 318, the message surfacing module 320, and the user device direction module 322. In fact, the functions of the aforementioned modules 312, 314, 316, 318, 320, 322 may interact and cooperate seamlessly under the framework of the hub user device 110. Indeed, each of the functions described for any of the modules 312, 314, 316, 318, 320, 322 may be stored in any module 312, 314, 316, 318, 320, 322 in accordance with certain example embodiments of the disclosure. Further, in certain example embodiments, there may be one single module that includes the instructions, programs, and/or applications described within the operating systems (O/S) module 312, the applications module 314, the message generation module 316, the message priority module 318, the message surfacing module 320, and the user device direction module 322.

Illustrative Processes

Figure 4:
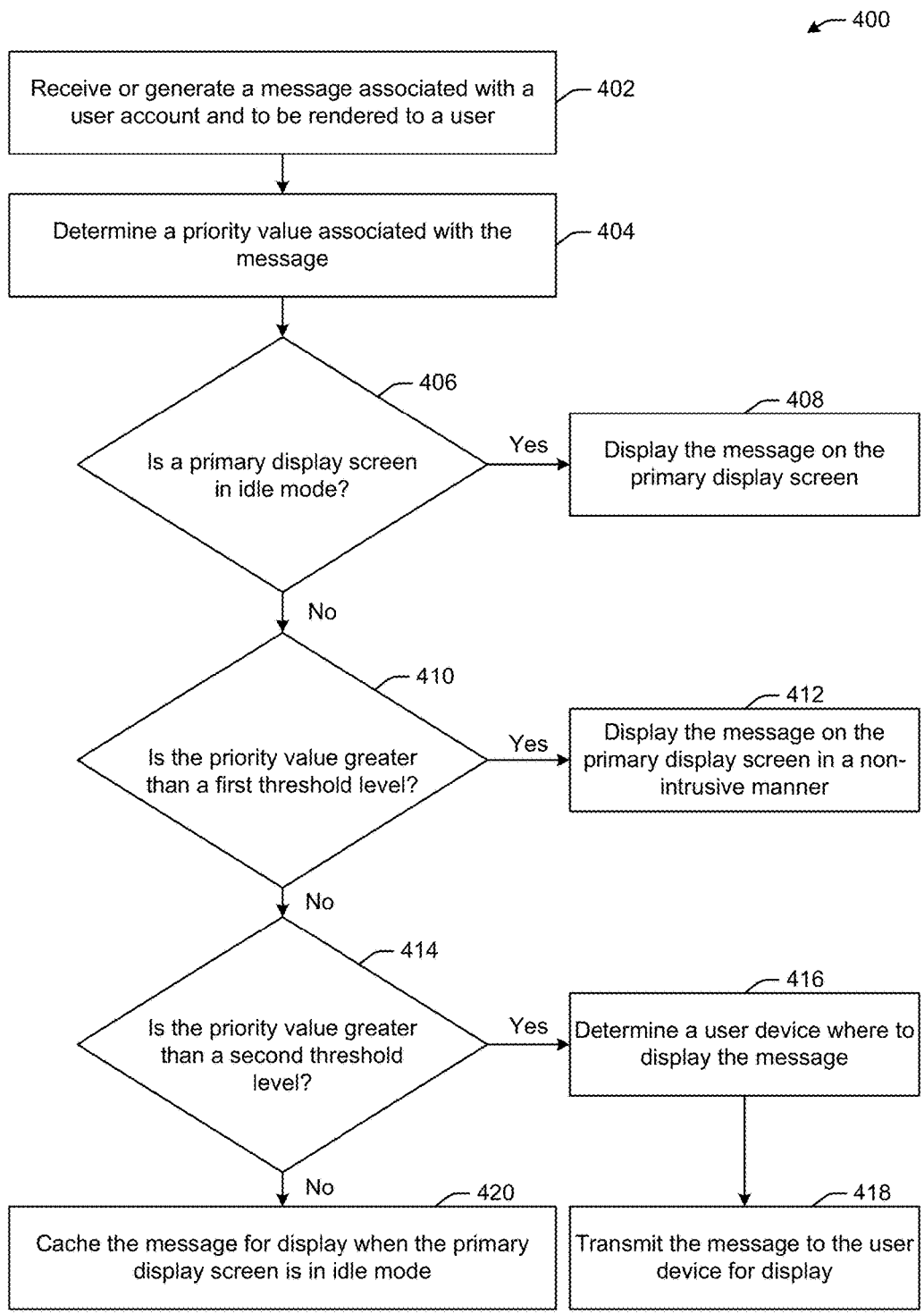
FIG. 4 is a flow diagram of an example method for displaying a message received by the hub user device, in accordance with example embodiments of the disclosure.

FIG. 4 is a flow diagram of an example method 400 for displaying a message received by the hub user device 110, in accordance with example embodiments of the disclosure. The method 400 may be performed, in example embodiments, by the hub user device 110 and the processors 300 thereon. At block 402, a message associated with a user account and to be rendered to a user may be received or generated. In some example embodiments, the message may have been generated at the messaging server(s) 130 and the processors 200 thereon. In other example embodiments, the message may be received by the messaging server(s) 130 from one or more other sources, such as the content server(s) 140. In yet other example embodiments, the messaging server(s) 130 may receive content from one or more other sources, such as the content server(s) 140 and generate a message therefrom. In other example embodiments, the message may be generated by the hub user device 110 and the processors 300 thereon. The message may be addressed to a particular user account. In some cases, this user account may be an individual user account (e.g., corporate email account). In other cases, this user account may be associated with more than one user.

At block 404, a priority value associated with the message may be determined. The priority value may be determined by first extracting information elements associated with the message. These information elements may be used for the purposes of comparing to a variety of criteria provided in a user profile associated with the message to determine a prediction of the importance and/or the urgency of the message. The information elements may include, for example, a source (e.g., sender or sender user account) of the message, key words in the header or the body of the message, any priority associated with of the message, the user account to which the message was sent, other contextual information of the message, or the like. Indeed, any information that can be harvested from the message for the purposes of comparing to criteria and/or characteristics of messages in a user profile to assign a priority value to the message may be extracted from the message. The extracted information elements may then be applied to the user profile corresponding to the message to determine a priority value of the message. In example embodiments, a comparison of the information elements of the message to characteristics of messages for which a priority score is provided in the user profile may be performed. If a match is found between one or more of the information elements and the characteristics mapped to priority values, then the corresponding priority value may be assigned to the message. If more than one information element is found to match with characteristics mapped in the user profile, then, in some cases the highest priority value may be assigned to the message. In other cases, an average of the values may be used as the priority value of the message. In other cases, the lowest priority value may be assigned to the message.

At block 406, it may be determined if the primary display screen is in idle mode. The primary display screen 120 may be inactive if the hub user device 110 is inactive, or otherwise not displaying any content. If it is determined that the primary display screen 120 is in idle mode, then at block 408, the message may be displayed on the primary display screen. The primary display screen may have a screensaver displayed thereon. In example embodiments, the message may be displayed on a screensaver displayed by the hub user device 110 on the primary display screen 120.

If, however, it is determined that the primary display screen 120 is not in an idle or inactive mode, then at block 410, it may be determined if the priority value is greater than a first threshold level. This threshold level may be indicative of a message that is predicted to be of greater importance and/or urgency relative to other messages that may be provided to the user 102. If it is determined that the priority value is greater than the first threshold level, then at block 412, the message may be displayed on the primary display screen in a non-intrusive manner. This display may be by, for example, a scroll across the primary display screen 120 (e.g., at the top or the bottom of the primary display screen), a relatively small pop-up box on the side of the primary display screen 120, during a break in the content, and/or while an advertisement associated with the content is being rendered.

If, however, it is determined at block 410 that the priority value is not greater than the first threshold level, then at block 414, it may be determined if the priority value is greater than a second threshold level. The second threshold level may be lower than the first threshold level and, in example embodiments, may be a threshold value indicative of a message of medium priority or urgency to the user 102 to whom the message is to be rendered. If it is determined that the priority value is greater than the second threshold value, then at block 416, a user device on where to display the message may be determined. This process is described in greater detail with reference to FIG. 6. At block 418, the message may be transmitted to the user device for display. The message may be transmitted, in example embodiments, to the selected user device 160 by a wireless connection established between the selected user device 160 and the hub user device 110. In some cases, the mode in which the message may be displayed on the selected user device 160 may vary based at least in part on the priority value associated with the message. For example, a relatively more important and/or urgent message (e.g., relatively greater priority value) may be displayed more prominently than a relatively less important and/or urgent message (e.g., relatively lower priority value) on the selected user device 160. The priority value and/or the mode/mechanism of display may be tagged to the message, such as in metadata, when transmitted to the user device 160 for display.

If at block 414 it is determined that the priority value is not greater than a second threshold level, then at block 420, the message may be cached for display when the primary display screen is in idle mode. This message may be considered a relatively low priority message. In example embodiments, the message may be stored and displayed when content displayed to the primary display screen 120 is paused, stopped, when switching between different content, at predetermined and/or user selected times, and/or when a lower priority content is displayed (e.g., advertisements) on the primary display screen 120. If the message has a timer or an expiration associated with it (e.g., a weather message for the next hour that becomes of little use after one hour), and the message expires before the primary display screen is inactive and/or idle, then the message may be discarded without being displayed at all. In some example embodiments, the priority value associated with the message may be reevaluated when an opportunity arises for displaying the message, such as on the primary display screen 120.

It should be noted that the method 400 may be modified in various ways in accordance with certain embodiments. For example, one or more operations of the method 400 may be eliminated or executed out of order in other embodiments. Additionally, other operations may be added to the method 400 in accordance with other embodiments.

Figure 5:
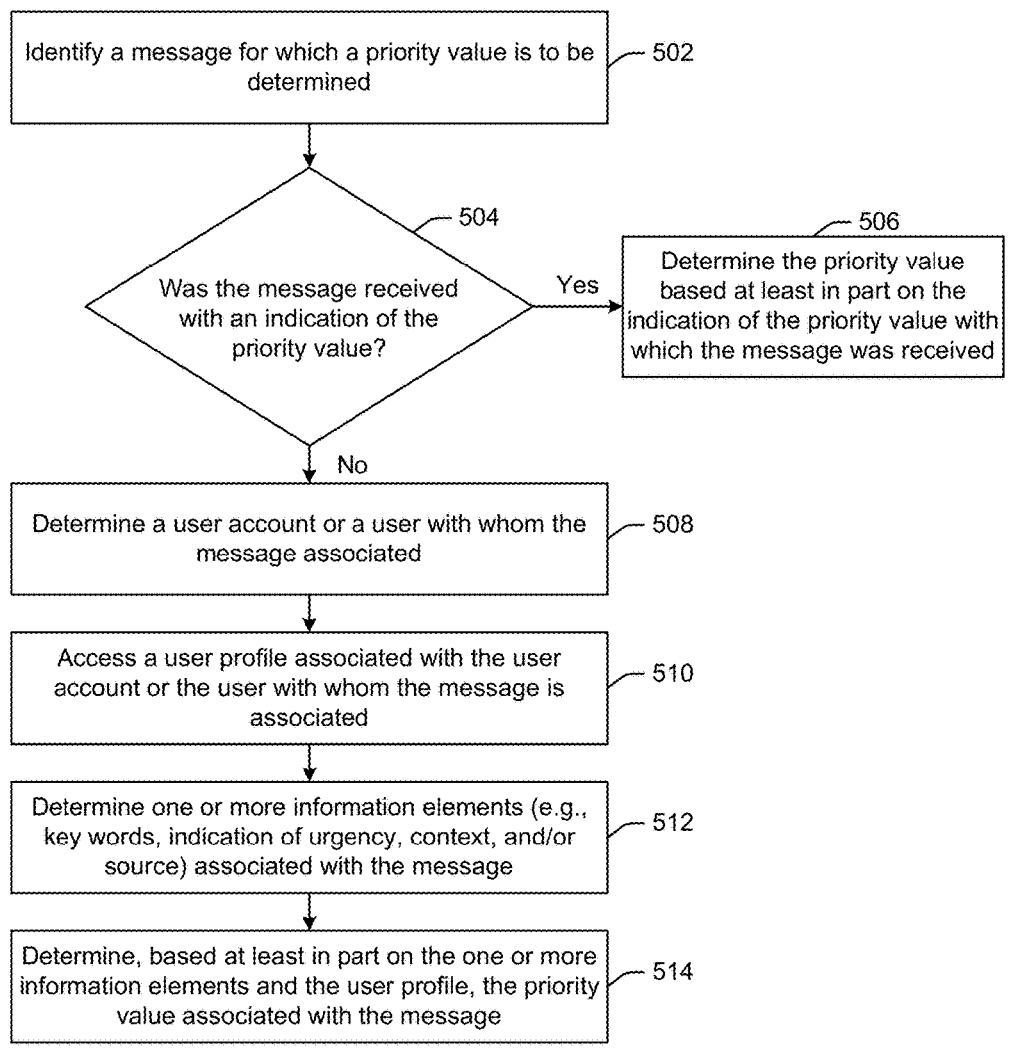
FIG. 5 is a flow diagram of an example method for determining a priority value, by the hub user device of FIG. 1, based on a message to be displayed, in accordance with example embodiments of the disclosure.

FIG. 5 is a flow diagram of an example method 500 for determining a priority value, by the hub user device 110 of FIG. 1, based on a message to be displayed, in accordance with example embodiments of the disclosure. The method 500 may be performed, in example embodiments, by the hub user device 110 and the processors 300 thereon. In example embodiments, method 500 may be an example implementation of processes of block 404 of method 400, as depicted in FIG. 4. At block 502, a message for which a priority value is to be determined may be identified. This message may have a user account associated therewith that can be ascertained by analyzing the header information associated with the message.

At block 504, it may be determined if the message was received with an indication of the priority value. If it is determined that the message was received with an indication of the priority value, then at block 506, the priority value may be determined based at least in part on the indication of the priority value with which the message was received. This priority value may have been determined by the messaging server(s) 130 prior to the hub user device 110 receiving the message.

If, however, at block 504 it is determined that the message was not received with an indication of the priority value, then at block 508, a user account or a user with whom the message is associated may be determined. The user account associated with the message may, in example embodiments, be ascertained by analyzing the header information associated with the message.

At block 510, a user profile associated with the user account or the user with whom the message is associated may be accessed. This user profile may be stored, accessed, and maintained on a datastore, such as a datastore in the storage/memory 310 of the hub user device 110. The user profile may further provide information associated with relative levels of interest that user(s) 102 associated with the user account to which the message is to be delivered may have with a variety of different messages. These preferences, interest levels, and/or importance levels of the user to whose user account the message is directed may be codified into a set of criteria, characteristics, and/or rankings as part of the user profile. These criteria, characteristics, and/or rankings may enable determining priority levels of messages based on factors including, but not limited to, message destination user accounts, source user and/or source user account, key words embedded in the message, metadata associated with the message, other context information associated with the message, combinations thereof, or the like. In example embodiments, a scale may be provided to ascertain the relative weighting of various factors that may be considered in determining the priority value associated with a particular message.

At block 512, one or more information elements (e.g., key words, indication of urgency, context, and/or source) associated with the message may be determined. These information elements may be used for the purposes of comparing to a variety of criteria provided in a user profile associated with the message to determine a prediction of the importance and/or the urgency of the message. The information elements may include, for example, a source (e.g., sender or sender user account) of the message, key words in the header or the body of the message, any priority associated with the message, the user account to which the message was sent, other contextual information of the message, or the like. Indeed, any information that can be harvested from the message for the purposes of comparing to criteria and/or characteristics of messages in a user profile to assign a priority value to the message may be extracted from the message.

At block 514, the priority value associated with the message may be determined based at least in part on the one or more information elements and the user profile. The extracted information elements may then be applied to the user profile corresponding to the message to determine a priority value of the message. In example embodiments, a comparison of the information elements of the message to characteristics of messages for which a priority score is provided in the user profile may be performed. If a match is found between one or more of the information elements and the characteristics mapped to priority values, then the corresponding priority value may be assigned to the message. If more than one information element is found to match with characteristics mapped in the user profile, then, in some cases the highest priority value may be assigned to the message. In other cases, an average of the values may be used as the priority value of the message. In other cases, the lowest priority value may be assigned to the message.

It should be noted that the method 500 may be modified in various ways in accordance with certain embodiments. For example, one or more operations of the method 500 may be eliminated or executed out of order in other embodiments. Additionally, other operations may be added to the method 500 in accordance with other embodiments.

Figure 6:
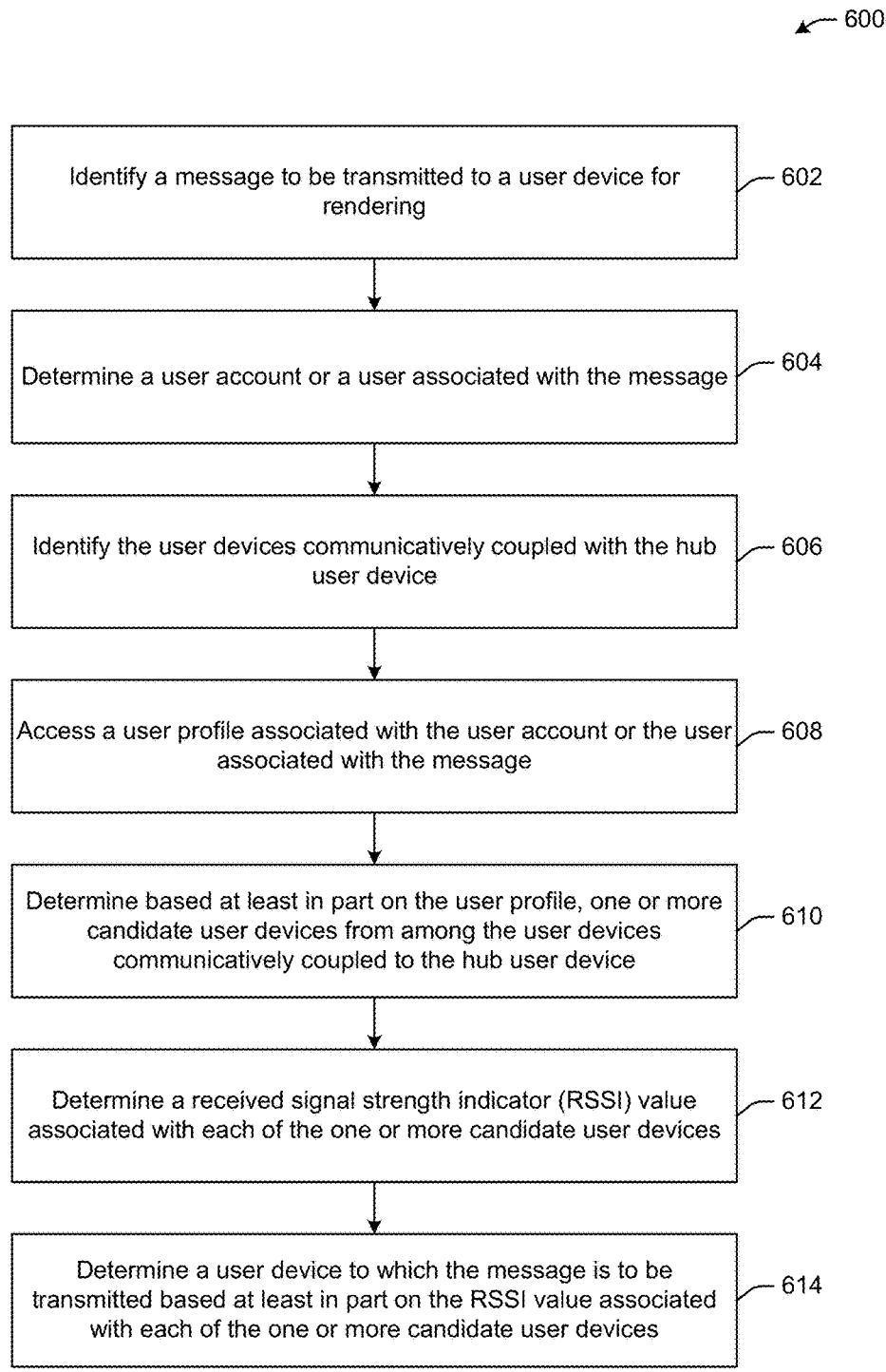
FIG. 6 is a flow diagram of an example method for determining a user device to which a message may be transmitted for display, in accordance with example embodiments of the disclosure.

FIG. 6 is a flow diagram of an example method 600 for determining a user device to which a message may be transmitted for display, in accordance with example embodiments of the disclosure. The method 600 may be performed, in example embodiments, by the hub user device 110 and the processors 300 thereon. In example embodiments, the hub user device 110 may cooperate with other entities of environment 100 to perform method 600. In example embodiments, method 600 may be an example implementation of processes of block 416 of method 400, as depicted in FIG. 4.

At block 602, a message to be transmitted to a user device for rendering may be identified. This message may, in example embodiments, be received from the messaging server(s) 130. In other example embodiments, this message may be generated at the hub user device 110. At block 604, a user account or a user associated with the message may be determined. The user account associated with the message may, in example embodiments, be ascertained by analyzing the header information associated with the message.

At block 606, the user devices communicatively coupled with the hub user device may be identified. The user devices 160 may be identified by the hub user device 110 by taking inventory of all the communicative connections the hub user device may have established by a variety of protocols, such as Bluetooth, Direct Wi-Fi, Wi-Fi, ZigBee, or the like. At block 608, a user profile associated with the user account or the user associated with the message may be accessed. This user profile may be stored, accessed, and maintained on a datastore, such as a datastore in the storage/memory 310 of the hub user device.

At block 610, one or more candidate user devices from among the user devices communicatively coupled to the hub user device may be determined based at least in part on the user profile. This subset of user devices 160 may be the ones that are associate with the particular user account to which the message is directed. At block 612, a received signal strength indicator (RSSI) value associated with each of the one or more candidate user devices may be determined. The RSSI values may be determined by determining the average power of the wireless signal received by the hub user device 110 from the user device 160.

At block 614, a user device to which the message is to be transmitted may be determined based at least in part on the RSSI value associated with each of the one or more candidate user devices. In some cases, the user device with the highest RSSI value may be selected. In other cases, the RSSI value of the user devices 160 may be normalized relative to a baseline level to ascertain a relative proximity of the user devices 160 to the hub user device 110.

It should be noted that the method 600 may be modified in various ways in accordance with certain embodiments. For example, one or more operations of the method 600 may be eliminated or executed out of order in other embodiments. Additionally, other operations may be added to the method 600 in accordance with other embodiments.

Figure 7:
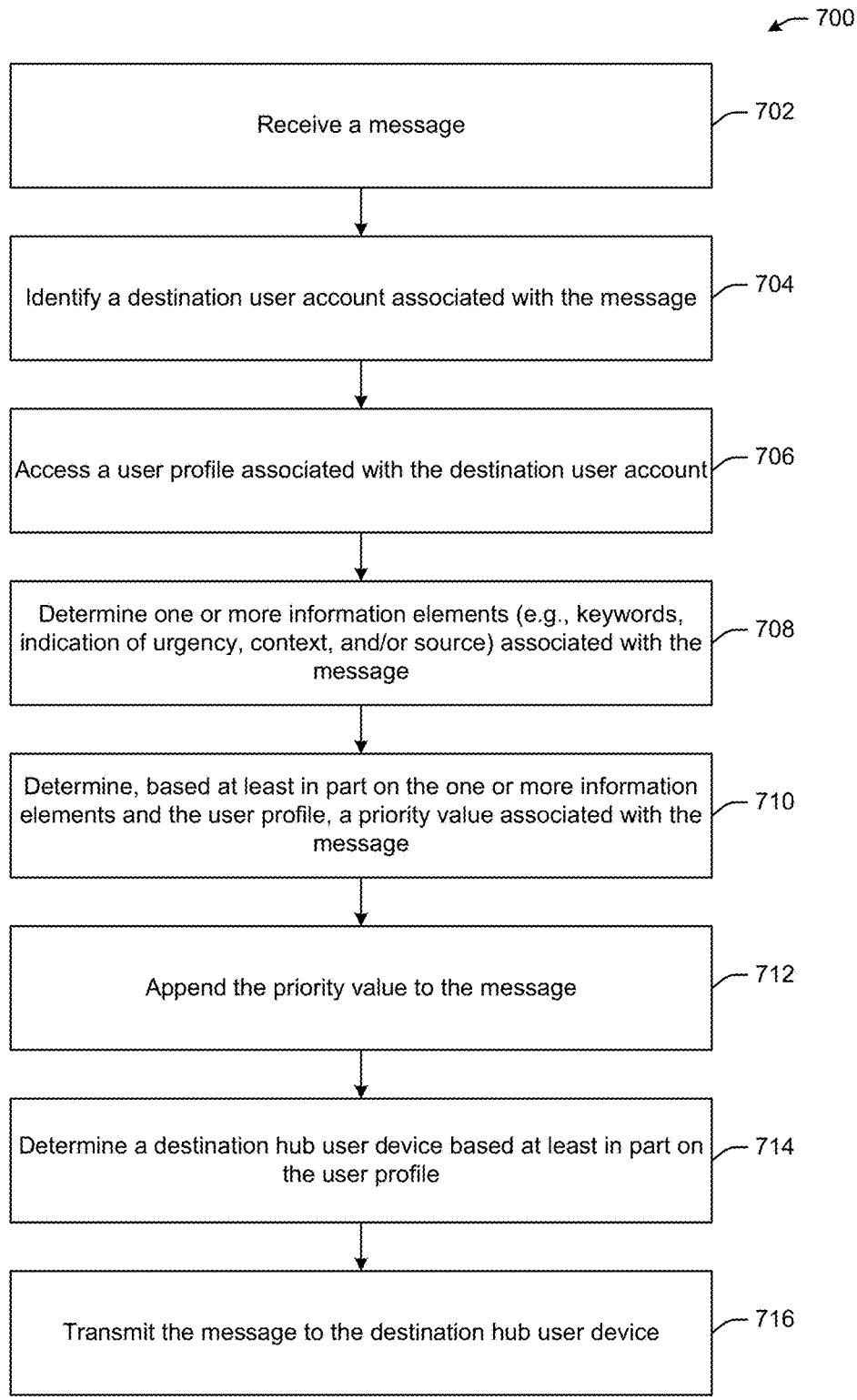
FIG. 7 is a flow diagram of an example method for determining a priority value, by the messaging server(s) of FIG. 1, in accordance with example embodiments of the disclosure.

FIG. 7 is a flow diagram of an example method 700 for determining a priority value, by the messaging server(s) 130 of FIG. 1, in accordance with example embodiments of the disclosure. The method 700 may be performed, in example embodiments, by the messaging server(s) and the processors 200 thereon. At block 702, a message may be received. This message may be received from any suitable source, such as the content server(s) 140. At block 704, a destination user account associated with the message may be identified. The user account may be determined by analyzing the header and/or metadata that may be associated with the received message. The user account may be any suitable type of account, such as an email account, a text message number, a social media handle, a commerce website login, or the like.

At block 706, a user profile associated with the destination user account may be accessed. In example embodiments, a database, such as one stored in storage/memory 210 of the messaging server(s) 130 may provide a correspondence between the user account and the associated user profile. This user profile, upon being identified may be accessed from any suitable database where the user profile may be stored, such as the storage/memory 210.

At block 708, one or more information elements (e.g., key words, indication of urgency, context, and/or source) associated with the message may be determined. These information elements may be used for the purposes of comparing to a variety of criteria provided in a user profile associated with the message to determine a prediction of the importance and/or the urgency of the message. The information elements may include, for example, a source (e.g., sender or sender user account) of the message, key words in the header or the body of the message, any priority associated with the message, the user account to which the message was sent, other contextual information of the message, or the like. Indeed, any information that can be harvested from the message for the purposes of comparing to criteria and/or characteristics of messages in a user profile to assign a priority value to the message may be extracted from the message.

At block 710, a priority value associated with the message may be determined based at least in part on the one or more information elements and the user profile. The extracted information elements may then be applied to the user profile corresponding to the message to determine a priority value of the message. In example embodiments, a comparison of the information elements of the message to characteristics of messages for which a priority score is provided in the user profile may be performed. If a match is found between one or more of the information elements and the characteristics mapped to priority values, then the corresponding priority value may be assigned to the message. If more than one information element is found to match with characteristics mapped in the user profile, then, in some cases the highest priority value may be assigned to the message. In other cases, an average of the values may be used as the priority value of the message. In other cases, the lowest priority value may be assigned to the message.

At block 712, the priority value may be appended to the message. In example embodiments, the priority value may be appended as metadata associated with the message. At block 714, a destination hub user device may be determined based at least in part on the user profile. At block 716, the message may be transmitted to the destination hub user device.

It should be noted that the method 700 may be modified in various ways in accordance with certain embodiments. For example, one or more operations of the method 700 may be eliminated or executed out of order in other embodiments. Additionally, other operations may be added to the method 700 in accordance with other embodiments.

Figure 8:
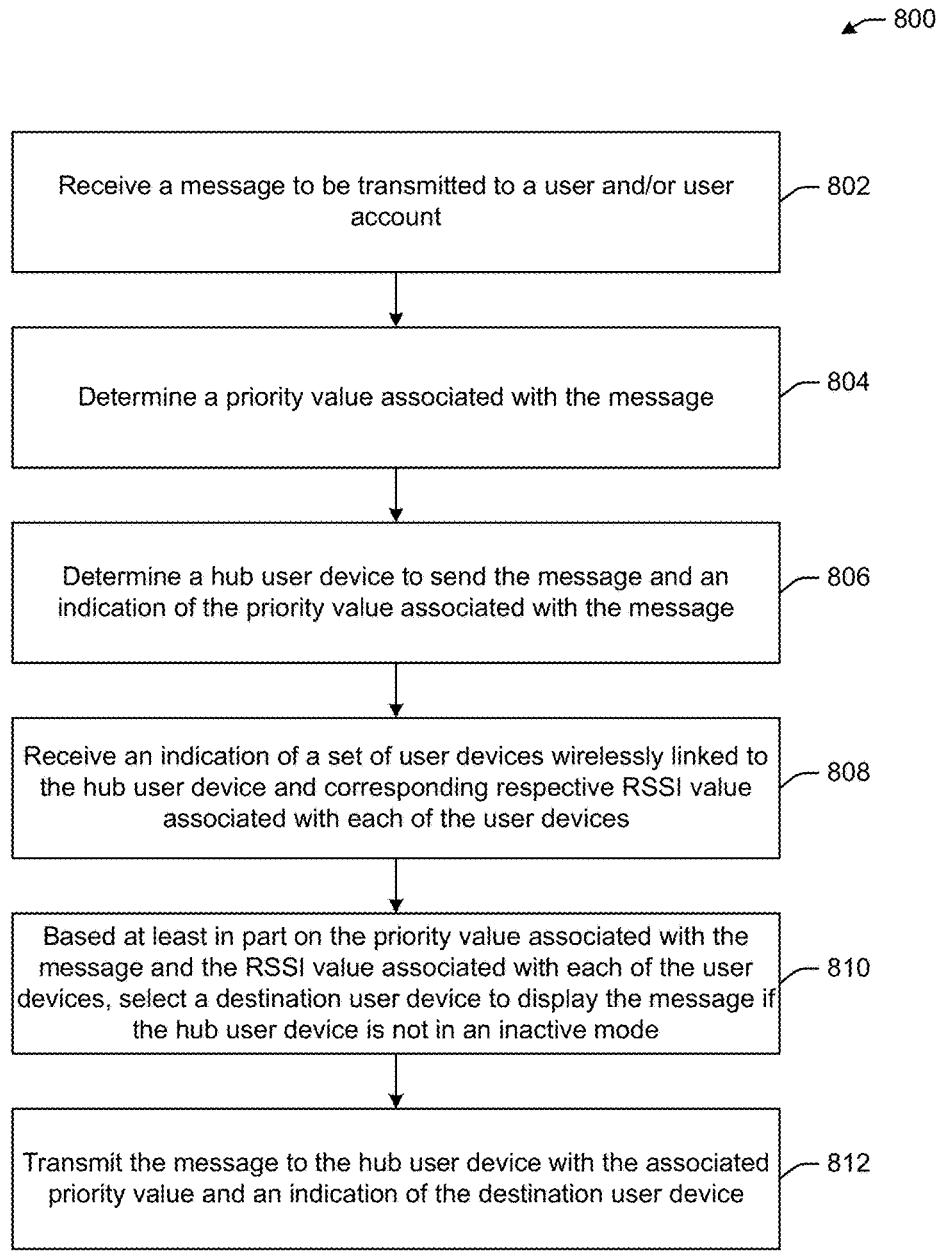
FIG. 8 is a flow diagram of an example method for determining, by the messaging server(s) of FIG. 1, a user device to which a hub user device is to transmit a message for display to a user, in accordance with example embodiments of the disclosure.

FIG. 8 is a flow diagram of an example method 800 for determining, by the messaging server(s) of FIG. 1, a user device 160 to which a hub user device 110 is to transmit a message for display to a user 102, in accordance with example embodiments of the disclosure.

At block 802, a message to be transmitted to a user and/or a user account may be received. At block 804, a priority value associated with the message may be determined. The priority value may be determined by first extracting information elements associated with the message. These information elements may be used for the purposes of comparing to a variety of criteria provided in a user profile associated with the message to determine a prediction of the importance and/or the urgency of the message. The information elements may include, for example, a source (e.g., sender or sender user account) of the message, key words in the header or the body of the message, any priority associated with the message, the user account to which the message was sent, other contextual information of the message, or the like. Indeed, any information that can be harvested from the message for the purposes of comparing to criteria and/or characteristics of messages in a user profile to assign a priority value to the message may be extracted from the message. The extracted information elements may then be applied to the user profile corresponding to the message to determine a priority value of the message. In example embodiments, a comparison of the information elements of the message to characteristics of messages for which a priority score is provided in the user profile may be performed. If a match is found between one or more of the information elements and the characteristics mapped to priority values, then the corresponding priority value may be assigned to the message. If more than one information element is found to match with characteristics mapped in the user profile, then, in some cases the highest priority value may be assigned to the message. In other cases, an average of the values may be used as the priority value of the message. In other cases, the lowest priority value may be assigned to the message.

At block 806, a hub user device to send the message and the indication of the priority value associated with the message may be determined. At block 808, an indication of a set of user devices wirelessly linked to the hub user device may be received along with corresponding respective RSSI values associated with each of the user devices. In example embodiments, this information may be received from the hub user device 110. At block 810, a destination user device to display the message if the hub user device is not in an inactive mode may be selected based at least in part on the priority value associated with the message and the RSSI value associated with each of the user devices. In some cases, the user device with the highest RSSI value may be selected. In other cases, the RSSI value of the user devices 160 may be normalized relative to a baseline level to ascertain a relative proximity of the user devices 160 to the hub user device 110. At block 812, the message may be transmitted to the hub user device along with the associated priority value and an indication of the destination user device.

It will be appreciated that in some alternative example embodiments, the messaging server(s) 130 may transmit the message directly to the user device 160 that is to receive the message. In these example embodiments, the messaging server(s) 130 may receive a notification and/or solicit a status of the hub user device 110 to ascertain if the hub user device 110 is engaged in any activities that would preclude it from surfacing the message, such as on the primary display screen 120. If it is determined that the hub user device 110 is otherwise engaged, such as by rendering content, and the priority value is determined to be such that the message is to be redirected to another user device 160 associated with the recipient user 102, then the messaging server(s) 130 and the processor(s) 200 thereon may bypass the hub user device 110 entirely and transmit the message directly to the user device 160 determined to be the recipient user device 160.

It should be noted that the method 800 may be modified in various ways in accordance with certain embodiments. For example, one or more operations of the method 800 may be eliminated or executed out of order in other embodiments. Additionally, other operations may be added to the method 800 in accordance with other embodiments.

Figure 9:
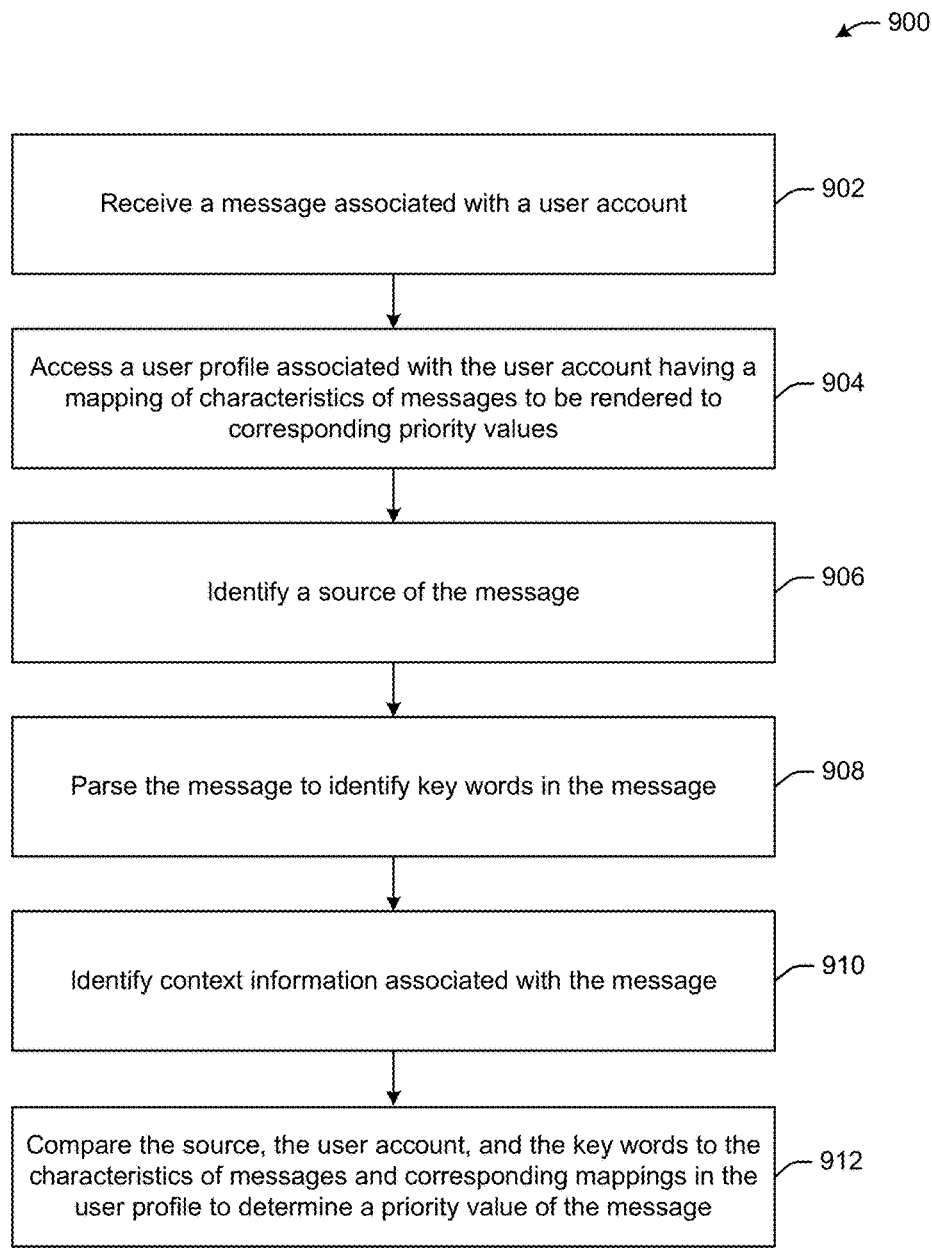
FIG. 9 is a flow diagram of another example method for determining a priority value of a message, in accordance with example embodiments of the disclosure.

FIG. 9 is a flow diagram of another example method 900 for determining a priority value of a message, in accordance with example embodiments of the disclosure. Method 900 may be performed by either of the messaging server(s) 130 and the processors 200 thereon or the hub user device 110 and the processors 300 thereon. At block 902, a message associated with a user account may be received. At block 904, a user profile associated with the user account having a mapping of characteristics of messages to be rendered to corresponding priority values may be accessed. The user profile may further provide information associated with relative levels of interest that user(s) 102 associated with the user account to which the message is to be delivered may have with a variety of different messages. These preferences, interest levels, and/or importance levels of the user to whose user account the message is directed may be codified into a set of criteria, characteristics, and/or rankings as part of the user profile. These criteria, characteristics, and/or rankings may enable determining priority levels of messages based on factors including, but not limited to, message destination user accounts, source user and/or source user account, key words embedded in the message, metadata associated with the message, other context information associated with the message, combinations thereof, or the like. In example embodiments, a scale may be provided to ascertain the relative weighting of various factors that may be considered in determining the priority value associated with a particular message.

At block 906, a source of the message may be identified. This may be determined from a header associated with the message. At block 908, the message may be parsed to identify key words. At block 910, context information associated with the message may be determined. At block 912, a priority value of the message may be determined based at least in part on comparing the source, the user account, and the key words to the characteristics of messages, context information, and corresponding priority value mappings in the user profile. The extracted information elements may be applied to the user profile corresponding to the message to determine a priority value of the message. In example embodiments, a comparison of the information elements of the message to characteristics of messages for which a priority score is provided in the user profile may be performed. If a match is found between one or more of the information elements and the characteristics mapped to priority values, then the corresponding priority value may be assigned to the message. If more than one information element is found to match with characteristics mapped in the user profile, then, in some cases the highest priority value may be assigned to the message. In other cases, an average of the values may be used as the priority value of the message. In other cases, the lowest priority value may be assigned to the message.

It should be noted that the method 900 may be modified in various ways in accordance with certain embodiments. For example, one or more operations of the method 900 may be eliminated or executed out of order in other embodiments. Additionally, other operations may be added to the method 900 in accordance with other embodiments.

Figure 10:
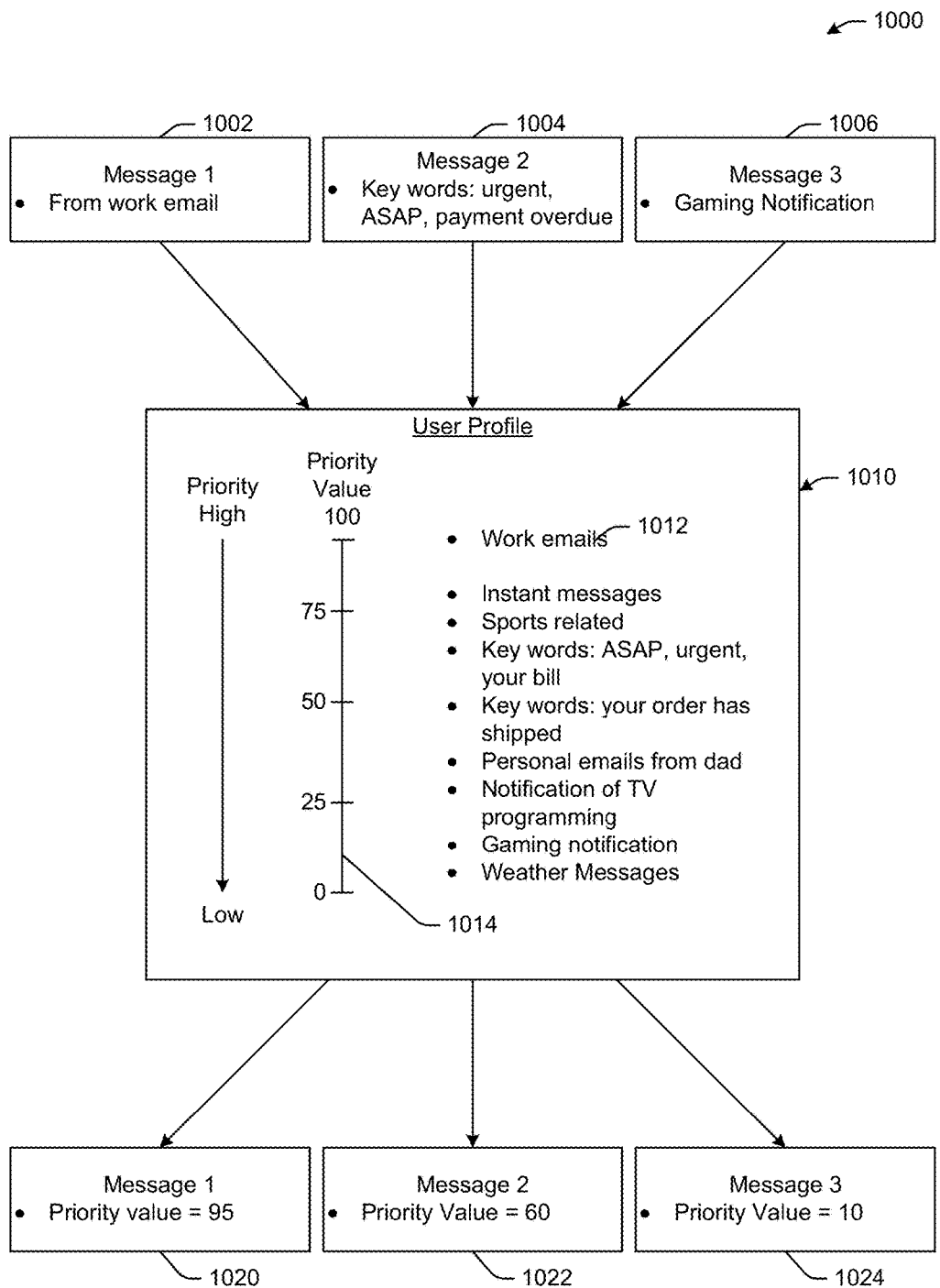
FIG. 10 illustrates a schematic representation of the method depicted in FIG. 9 for determining a priority value used to select a mechanism by which to present a message to the user, in accordance with example embodiments of the disclosure.

FIG. 10 illustrates a schematic representation of the method 900 depicted in FIG. 9 for determining a priority value 1000 used to select a mechanism by which to present a message to the user, in accordance with example embodiments of the disclosure. This assessment of the priority value may be performed by either of the messaging server(s) 130 and the processors 200 thereon or the hub user device 110 and the processors 300 thereon. In this example, there may be three different messages 1002, 1004, 1006 applied to a user profile 1010 to determine the corresponding priority value. It will be appreciated that some of the messages 1002, 1004, 1006 may be received by the hub user device 110, such as from the messaging server(s) 130, and other messages 1002, 1004, 1006 may be generated by the hub user device 110. For example, the messages 1002, 1004 may be received from the messaging server(s) 130, while the message 1006 may be generated by the hub user device 110. The user profile 1010 may provide a listing of characteristics 1012 of messages 1002, 1004, 1006 and a corresponding numerical value (e.g., priority value) on the scale 1014 for each of the characteristics 1012. In this example, the information element extracted from the first message may be that the message is from a work email account. As a result, according to the scale 1014, this characteristic may be given a value of 95 1020. Similarly, the second message 1004 may have a listing of key words that may be target words for one of the characteristics/criterion 1012 of the user profile and may be given a score of 60 1022 according to the scale 1014. Similarly, the third message 1006 may be a type of message that is a characteristic 1012 that is mapped to a value in the scale 1014 in the user profile 1010. In this case, the third message may be assigned a priority value of 10 1024. As a result, it can be seen that the assignment of priority values to each of the messages 1002, 1004, 1006 may provide a sense of priority of those messages to the user(s) 102 that are to receive the messages 1002, 1004, 1006. Furthermore, in addition to relative rankings of the messages, a quantitative ranking may be provided that can then be applied to one or more thresholds corresponding to different mechanisms of presenting the messages 1002, 1004, 1006 to the user(s) 102. It will be appreciated that although a scale 1014 from 0 to 100 was used in this example embodiment, the scale may be over any suitable range. Indeed, in example embodiments, the priority value may even be non-numerical, such as "low priority," "medium priority," and "high priority."

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, the distribution of software may be an Internet download.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A set top box (STB), comprising:
    at least one memory that stores computer-executable instructions;
    at least one processor configured to access the at least one memory, wherein the at least one processor is configured to execute the computer-executable instructions to:
        receive a message associated with a user account and an indication of a priority level associated with the message, wherein the priority level is based at least in part on a user profile associated with the user account and one or more of: (i) one or more key words of the message, (ii) a sender of the message, or (iii) the user account to which the message is directed from among a plurality of user accounts;
        determine that the STB is currently playing video content to a primary display screen communicatively coupled to the STB;
        determine that the priority level is less than a threshold level to display the message during playback of the video content;
        determine a first received signal strength indicator (RSSI) value associated with a first wireless communications signal between a smart phone associated with the user account and the STB;
        determine a second RSSI value associated with a second wireless communications signal between a tablet computing device associated with the user account and the STB;
        determine, based at least in part on the first RSSI value and the second RSSI value, that the message is to be sent to the smart phone; and
        send the message to the smart phone.

2. The STB of claim 1, wherein the message is a first message and the priority level is a first priority level, and wherein the at least one processor is configured to execute the computer-executable instructions to further:
    receive a second message associated with the user account and a second priority level associated with the second message, wherein the second priority level is based at least in part on the user profile associated with the user account and one or more of: (i) one or more key words of the second message, (ii) a sender of the second message, or (iii) the user account to which the message is directed from among a plurality of user accounts;
    determine that the STB is sending video content to the primary display screen;
    determine that the second priority level is greater than the threshold level to display the message during playback of the video content; and
    display the second message by scrolling the second message on the primary display screen during the playback of the video content.

3. The STB of claim 1, wherein the message is a first message and the priority level is a first priority level, and wherein the at least one processor is configured to execute the computer-executable instructions to further:
    receive a second message associated with the user account and a second priority level associated with the second message, wherein the second priority level is based at least in part on the user profile associated with the user account and one or more of: (i) one or more key words of the second message, (ii) a sender of the second message, or (iii) the user account to which the message is directed from among a plurality of user accounts;
    determine that the STB is currently sending the video content to the primary display screen;
    determine that the second priority level is less than the threshold level to display the message during playback of the video content; and
    store the second message in the at least one memory to be displayed when the video content is paused or a menu of content is being interacted with.

4. The STB of claim 3, wherein the at least one processor is further configured to execute the computer-executable instructions to further:
    determine that the STB is pausing the video content to the primary display screen;
    access the second message from the at least one memory;
    determine an expiration time associated with the second message;
    determine, using the expiration time, that the second message has expired;
    access a third message from the at least one memory;
    determine that the third message is valid; and
    display the third message on the primary display screen.

5. At least one device, comprising:
    at least one memory that stores computer-executable instructions;
    at least one processor configured to access the at least one memory, wherein the at least one processor is configured to execute the computer-executable instructions to:
        determine information associated with a first message, wherein the information comprises at least one of one or more key words of the message, a sender of the first message, or a user account associated with the first message;
        analyze the information with respect to one or more criteria of a user profile;
        determine that a portion of the information satisfies at least one criterion from the one or more criteria;
        determine a first priority value associated with the first message based at least in part on the portion of the information;
        determine that the first priority value associated with the first message is less than a first threshold to render the first message during presentation of content and that the first priority value is less than a second threshold to send the first message to a user device;
        store the first message;
        determine a second priority value associated with a second message;
        determine that the second priority value is less than the first threshold and that the second priority value is greater than the second threshold; and
        send the second message to the user device.

6. The at least one device of claim 5, wherein the at least one processor is further configured to execute the computer-executable instructions to receive the first message, and to determine the first priority value from respective metadata associated with the first message.

7. The at least one device of claim 5, wherein the information comprises the one or more key words of the first message, and wherein to determine the information, the at least one processor is further configured to execute the computer-executable instructions to:
    parse the first message to identify each key word in the one or more key words of the first message; and
    compare each key word to target key words included in the one or more criteria in the user profile.

8. The at least one device of claim 5, wherein the user device is a first user device and, wherein to send the second message to the user device, the at least one processor is configured to execute the computer-executable instructions to:
    determine a first received signal strength indicator (RSSI) value associated with a first wireless communications signal between the first user device and the at least one device;
    determine a second RSSI value associated with a second wireless communications signal between a second user device and the at least one device;
    determine that the first RSSI value is greater than the second RSSI value; and
    send the second message to the first user device.

9. The at least one device of claim 5, wherein the content comprises video content, and wherein the at least one processor is further configured to execute the computer-executable instructions to display the video content on a primary display screen, and wherein the first message comprises a visual message.

10. The at least one device of claim 5, wherein the content comprises audio content, and wherein the at least one processor is further configured to execute the computer-executable instructions to play the audio content on one or more speakers, and wherein the first message comprises an audible message.

11. The at least one device of claim 5, wherein to store the first message for rendering at a later time, the at least one processor is further configured to store the message during display of the content on a primary display screen.

12. The at least one device of claim 5, wherein to determine the first priority value associated with the first message based at least in part on the portion of the information, the at least one processor is further configured to execute the computer-executable instructions to further compare a mapping between the first priority value and the portion of the information, the mapping is included in the user profile.

13. The at least one device of claim 5, wherein the information comprises the one or more key words of the second message, and wherein to determine the information, the at least one processor is further configured to execute the computer-executable instructions to:
    parse the second message to identify each key word in the one or more key words of the second message; and
    compare each key word to target key words included in the one or more criteria in the user profile.

14. The at least one device of claim 5, wherein the content comprises video content, and wherein the at least one processor is further configured to execute the computer-executable instructions to display the video content on a primary display screen, and wherein the second message comprises a visual message.

15. The at least one device of claim 5, wherein the content comprises audio content, and wherein the at least one processor is further configured to execute the computer-executable instructions to play the audio content on one or more speakers, and wherein the second message comprises an audible message.

16. The at least one device of claim 5, wherein to store the second message for rendering at a later time, the at least one processor is further configured to store the message during display of the content on a primary display screen.

17. A method, comprising:
    determining, by at least one device comprising one or more computer processors, information associated with a first message, wherein the information comprises at least one of one or more key words of the first message, a sender of the first message, or a user account associated with the first message;

analyzing the information with respect to one or more criteria of a user profile;

determining that a portion of the information satisfies a criterion from the one or more criteria;

determining a first priority value associated with the first message based at least in part on the portion of the information;

determining that content is being presented;

determining that the first priority value associated with the first message is greater than a first threshold value to render the message during presentation of the content and that the first priority value is greater than a second threshold to store the first message for presentation at a later time;

presenting the first message;

determining, by the at least one device, a second priority value associated with a second message;

determining, by the at least one device, that the second priority value is less than the first threshold and that the second priority value is less than the second threshold; and storing, by the at least one device, the second message.

18. The method of claim 17, further comprising receiving, by the at least one device, the first message, and wherein the determining the first priority value comprises respectively identifying the first priority value from metadata associated with the first message.

19. The method of claim 17, further comprising:

determining, by the at least one device, that a hub user device has finished presenting the content;

determining, by the at least one device, an expiration time associated with the second message;

determining, by the at least one device and using the expiration time, that the second message has expired; and presenting, by the at least one device, a third message.

20. The method of claim 17, further comprising:

determining, by the at least one device, a first received signal strength indicator (RSSI) value associated with a first user device;

determining, by the at least one device, a second RSSI value associated with a second user device;

determining, by the at least one device, that the first RSSI value is greater than the second RSSI value; and sending, by the at least one device, the second message to the first user device.

21. The method of claim 17, wherein determining that the content is being presented comprises determining that video content is being presented on a primary display screen, and wherein presenting the first message or the second message comprises presenting a visual message.

22. The method of claim 17, further comprising:

determining, using at least the user profile, a second device to receive the first message or the second message;

adding metadata indicative of the priority value to the first message or the second message; and sending the first message or the second message to the second device.

* * * * *